United States Patent
Sheng et al.

(10) Patent No.: US 6,697,176 B1
(45) Date of Patent: Feb. 24, 2004

(54) SCANNER FRAME WITH COPLANAR SCAN WINDOW

(75) Inventors: Thomas Sheng, Hsinchu (TW); Chi-Yao Chen, Hsin-Chu (TW)

(73) Assignee: Avision Inc., Hsin-Chu (TW)

( * ) Notice: Subject to any disclaimer, the term of this patent is extended or adjusted under 35 U.S.C. 154(b) by 656 days.

(21) Appl. No.: 09/668,539

(22) Filed: Sep. 25, 2000

(30) Foreign Application Priority Data

Jan. 6, 2000 (TW) ......................................... 89100289 A

(51) Int. Cl.[7] .......................... H04N 1/04; G03G 15/00
(52) U.S. Cl. .................. 358/497; 358/474; 358/471; 399/379; 355/75
(58) Field of Search .................. 358/474, 497, 358/494, 400, 471, 505, 506, 487, 401; 382/312, 318; 399/211, 379, 380; 355/75; 250/234–236, 208.1

(56) References Cited

U.S. PATENT DOCUMENTS

| | | | | |
|---|---|---|---|---|
| 5,734,483 A | * | 3/1998 | Itoh | 358/474 |
| 6,144,465 A | * | 11/2000 | Hayashi | 358/474 |
| 6,285,441 B1 | * | 9/2001 | Takahara | 358/474 |
| 6,473,206 B1 | * | 10/2002 | Fujimoto et al. | 358/497 |

* cited by examiner

*Primary Examiner*—Cheukfan N Lee
(74) *Attorney, Agent, or Firm*—H. C. Lin

(57) ABSTRACT

The surface of the glass window of a scanner is coplanar with flanges on top of the scanner frame. The light path between the scan window and the light sensor mounted on the frame is prevented from varying regardless of any interface tolerance in mechanical dimension of the optical components in the light path between the scan window and the light sensor.

17 Claims, 6 Drawing Sheets

SCANNER FRAME WITH COPLANAR SCAN WINDOW

BACKGROUND OF THE INVENTION

1. Field of the Invention

This invention relates to scanners, particularly to the frame of a scanner or copying machine.

2. Brief Review of the Related Art

In a scanner, it is important to maintain a fixed light path from the scanned document to the light sensor. An approach to maintain the fixed light path is to use the Dual Light Module. In a conventional scanner, the scanning window and the light sensor are mounted on different component parts of the scanner frame. Between the scan window and the light sensor are many optical components. The interfaces between these components may have mechanical tolerances relative to one another. As a result, the light path may vary from the design value. Then, error may be introduced in the reproduced image.

FIG. 1 shows a prior art mounting structure of a dual optical module scanner as disclosed in Taiwan Patent Application No. 084210836. In this figure, a scanner window 12 is mounted on the frame 10 of the scanner through two L-shaped brackets 11. The sensor 18 is mounted on the bottom surface of the frame 10. The L-shaped brackets 11 have two flanges 114 to scanning glass 12. The bottom surfaces of the brackets 11 rest on two flanges 14 of the frame 10. A guiding rail 16 is mounted on the frame for one or two optical modules (not shown) to slide back and forth. The guiding rail 16 is hanging on the frame 10 through two holes 15 along the side wall 17 as shown in the 3-dimensional drawing FIG. 2. The L-shaped brackets 11 are pinned to the frame by pins 13 as shown in FIG. 1 through holes 103 on the flanges 14 as shown in FIG. 2.

The structure in FIGS. 1 and 2 have tolerance problems. The optical system has three optical sub-units. All these sub-units may have relative interface offset with respect to each other. If there is any offset due to tolerance in their dimensions, the length of the light path will be affected.

To avoid the tolerance problem, the light sensor 18 and the guiding rail 16 for the scanning carriage, the material of the frame 10 must be of low temperature coefficient metal. At present, the frame 10 is essentially made of sheet metal base, covered with the bracket 11, which improves the appearance and supports the heavy scanning glass window. The bracket also serves as an interface between the metal base and the glass window to avoid direct contact of the hard surface of the window and hard surface of the metal frame. As shown in FIG. 1, the L-shaped bracket supports the window at the interface (flange) 114. Such a structure suffers from the tolerance problem of the cushioning bracket.

SUMMARY

An object of this invention is to avoid any light path error between the scan window and the light sensor. Another object of this invention is to planarize the surface of the scan window and top surface of the frame.

These object are achieved by planarizing the top surface of the scanner frame, where the light sensor is mounted, with one of the surfaces of the scan window. With the two coplanar surfaces, there can be no relative motion between the glass window and the frame and the light path between them cannot deviate. The light path between the scan window and the light sensor on the frame of the scanner does not vary regardless of any interface tolerance of the optical components of the optical modules.

DETAILED DESCRIPTION OF THE INVENTION

Figure 3:
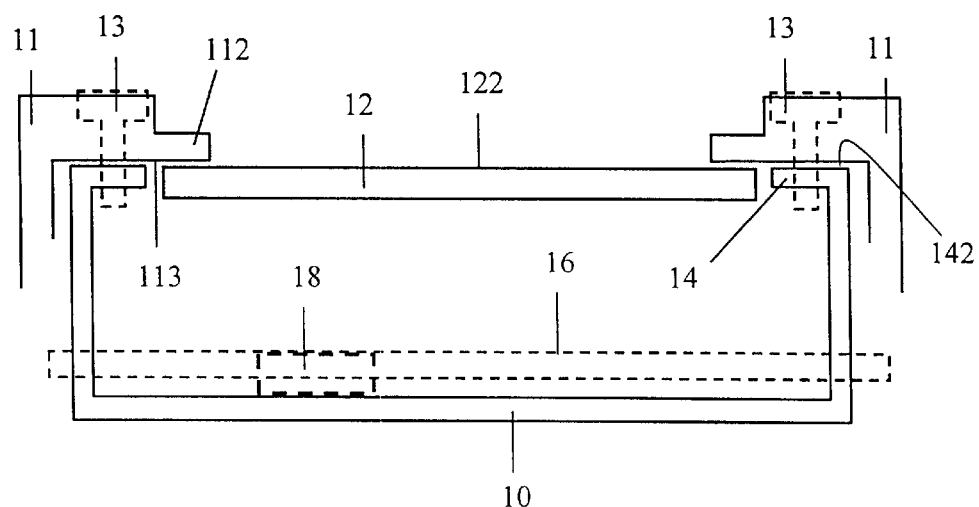
FIG. 3 shows a first embodiment of the planar attachment of the scan glass on top of the scanner frame based on the present invention.

The basic structure of this present invention is shown in FIG. 3. The scanner frame 10 has two flanges 14 with top surface 142. The scan glass 12 has a top surface 122. The top surface 142 and the top surface 122 are coplanar with or aligned along a horizontal plane. Since the scanned document is placed over the glass surface 122 and the sensor 18 is attached to the frame 10, the light path between the scanned document and the sensor is fixed in length so long as glass surface is fixed or coplanar with respect to the frame regardless any component interface tolerance errors. When the light path does not vary, the scanned image is of high quality.

Figure 1:
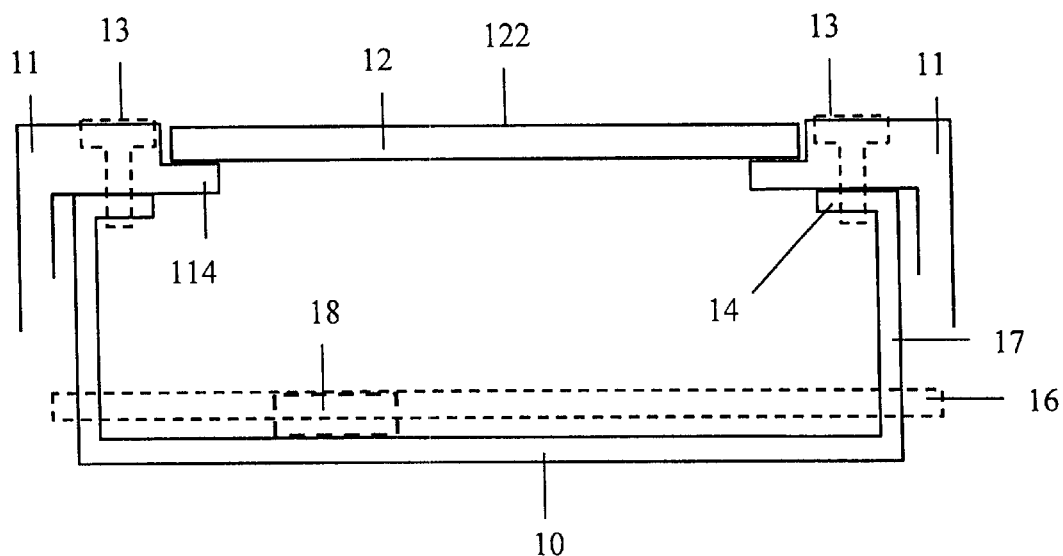
FIG. 1 shows a prior art mounting arrangement of a scan glass on top of a scanner frame.
Figure 2:
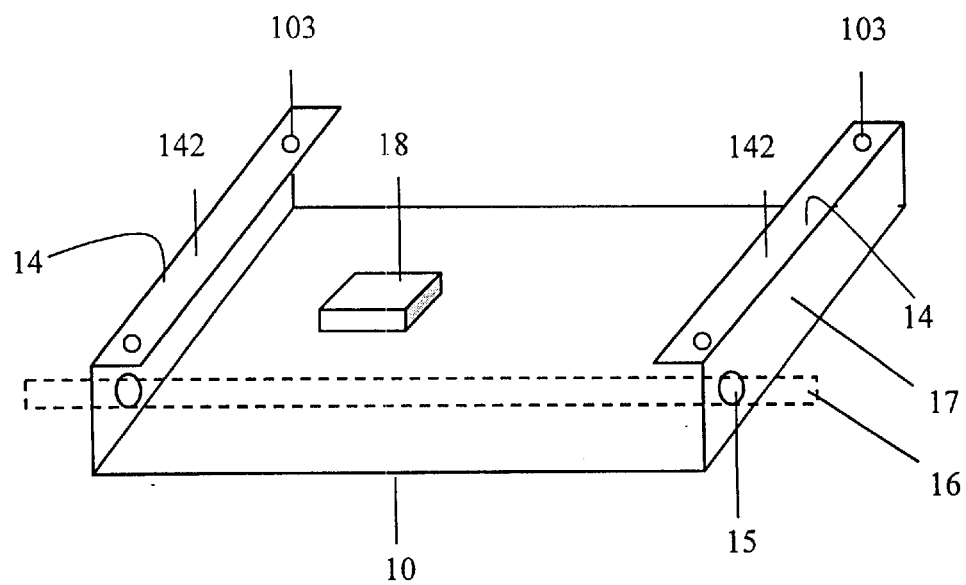
FIG. 2 shows a 3-dimensional view of FIG. 1.

In FIG. 3, the top surface 142 of the flanges 14 is aligned with the top surface of the glass window by means of the L-shaped brackets 11. The L-shaped bracket 11 has a planar bottom surface 113 which has an extension 112 to cover the edges of the glass surface 122. The brackets 11 are pinned to the flanges 14 by pins 13. Thus the top surface of the glass surface or glass window 122 is coplanar and fixed with respect to the flanges 14 of the frame 10. The lower half of the frame is the same as that in FIG. 1. The light sensor 18 is mounted at the bottom of the frame 10. A rail 16 for guiding the optical modules (not shown) is hanging between the walls of the frame 10.

Figure 4:
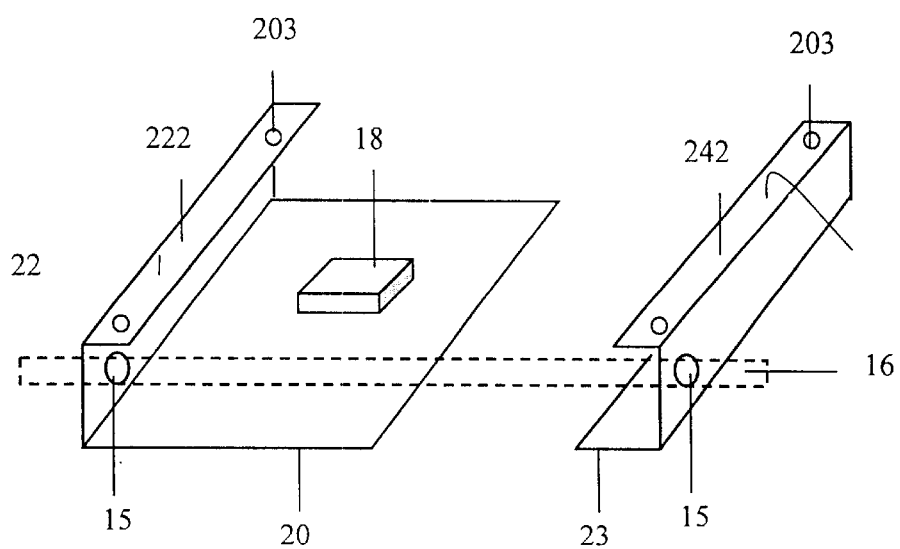
FIG. 4 shows a 3-dimensional view of a second frame structure for FIG. 3.

FIG. 4 shows a variation of the frame, where the base of the frame is split into two sections 22 and 23. The light sensor 18 is mounted on the bottom 20 of left section 22. The left wall has a top flange 222 with two holes 203 for the pins 13 in FIG. 3 to nest. The right section 23 also has a flange 242 similar to the left section. The rail 16 hangs on two holes 15 in the vertical walls of sections 22 and 23. Since the light sensor 18 is mounted on the bottom 20 of the section 22 and the flange 222 of section 22 is coplanar with respect to the glass window or scan glass 12, the light path from the scan surface of the glass window to the light sensor 18 must remain stable without any tolerance error between the optical component interfaces.

Figure 5:
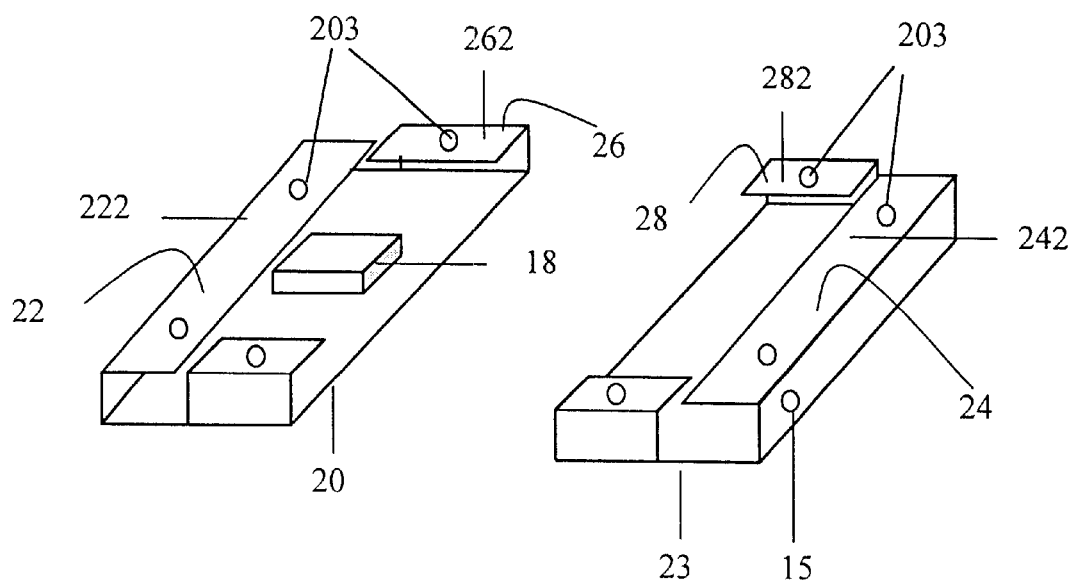
FIG. 5 shows a third frame structure for FIG. 3.

FIG. 5 shows another variation of the bottom frame. In addition to the flanges along the longitudinal direction of the guiding rail 16, two more flanges 26 and 28 orthogonal to the section 22 are added to the top of the frame. These flanges 26 and 28 have two more pin holes 203 for two more pins to nest. With these orthogonal flanges, the scan glass 12 is prevented from moving with respect to the frame in the direction orthogonal to the direction of the rail 16. Thus, the light path between the scanned surface and the light sensor is further stabilized.

Figure 6:
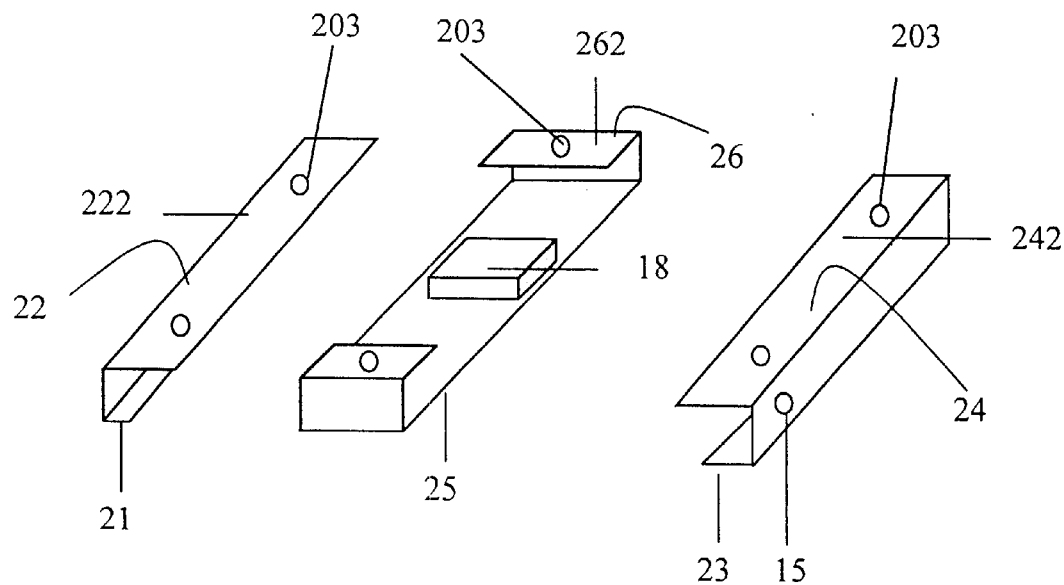
FIG. 6 shows a fourth frame structure for FIG. 3.

FIG. 6 shows a second variation of the bottom frame. There are three sections of the frame, the left section 21 with a top flange 22, the middle section 25 with top flanges 26, and the right section 23 with a top flange 24. The flanges 26 of the middle section are bent in a direction orthogonal to the flanges 22 and 24 of the left section 21 and the right section 23 respectively. The light sensor 18 is mounted on the bottom of the middle section 25. The top surface 222 of the left section flange 22, the top surfaces 262 of middle section flange 26, and the top surface 242 of the right section flange 24 are coplanar with respect to the scan glass surface (not shown in FIG. 6) by means of pins through the pin holes 203. The left flange 22 and the right flange 24 prevent any relative movement between the frame and the scan window along the direction of the rail hanged by the hole 15. The flanges 26 prevent any relative movement along a perpendicular direction. With such a provision, the light path from the scan window to the sensor 18 cannot vary due to other interface tolerance of the optical components.

Figure 7:
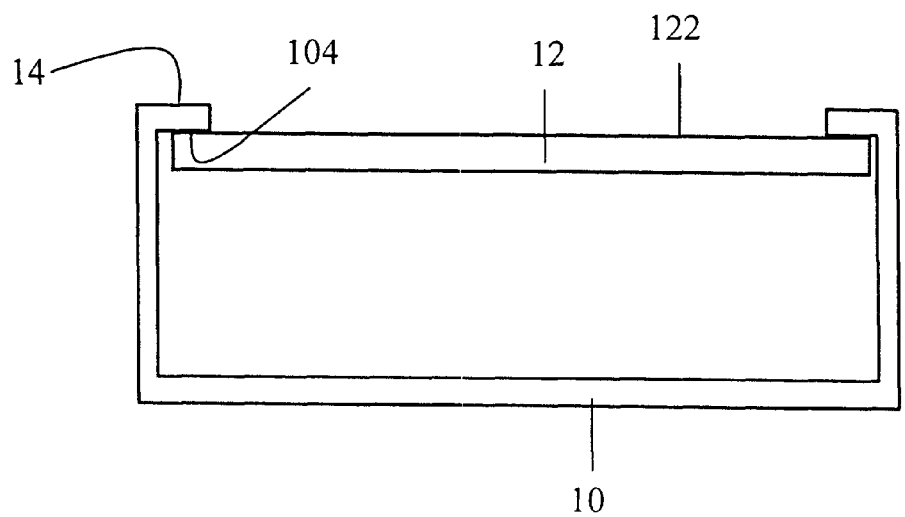
FIG. 7 shows a second embodiment of coplanar attachment of the scan glass on top of scanner frame.

FIG. 7 shows another embodiment of the present invention. The top surface 122 of the scan glass 12 is coplanar with the bottom surface 104 of the flange 14 of the frame 10, where the light sensor is mounted. Like the structure shown in FIG. 3, the light path between the scan window surface 122 and the light sensor mounted on the bottom of the frame does not vary regardless of interface tolerance of optical components in the path.

Figure 8:
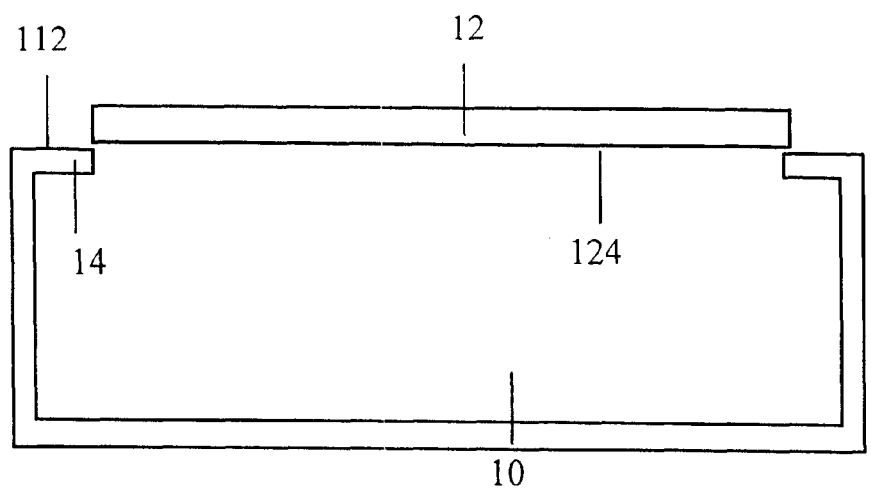
FIG. 8 shows a third embodiment of coplanar attachment of the scan glass on top of scanner frame.

FIG. 8 shows still another embodiment of the present invention. The difference between FIG. 8 and FIG. 3 is that the top surface 112 of the flanges 14 of the frame 10 is coplanar with respect to the bottom surface 124 of the scan window 12. In the same token, the light path between the scan window surface 124 to the light sensor mounted on the bottom of the frame 10 does vary regardless of interface tolerance of optical components in the path.

Figure 9:
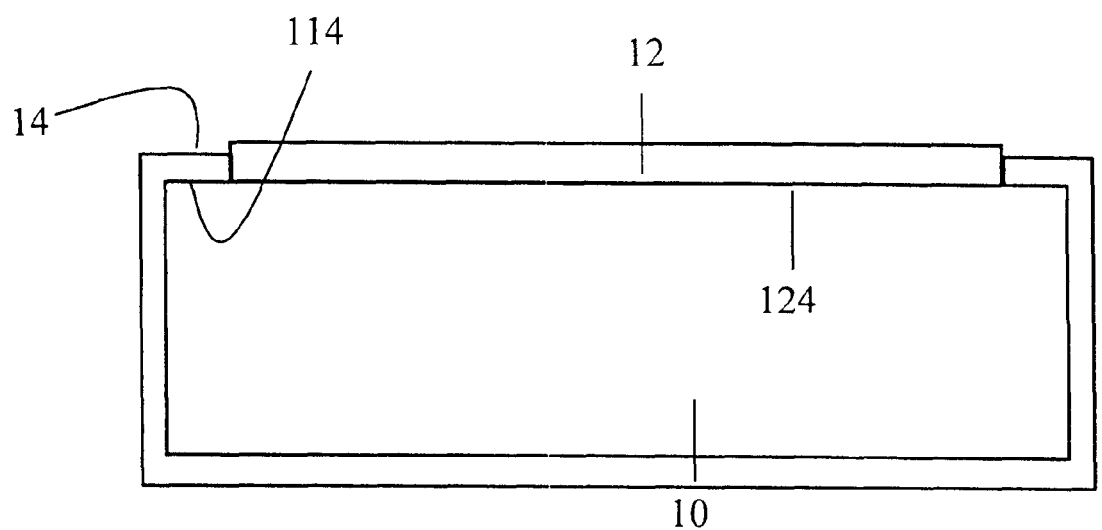
FIG. 9 shows a fourth embodiment of coplanar attachment of the bottom of the scan window with the bottom of the flanges on top of scanner frame.

FIG. 9 shows a fourth embodiment of the present invention. The bottom surface 114 of the flanges 14 is coplanar with the bottom surface 124 of the scan window 12. Again, the light path between the scan window surface and the light sensor mounted on the bottom of the frame 10 does not vary regardless of interface tolerance of optical components in the path.

Figure 10:
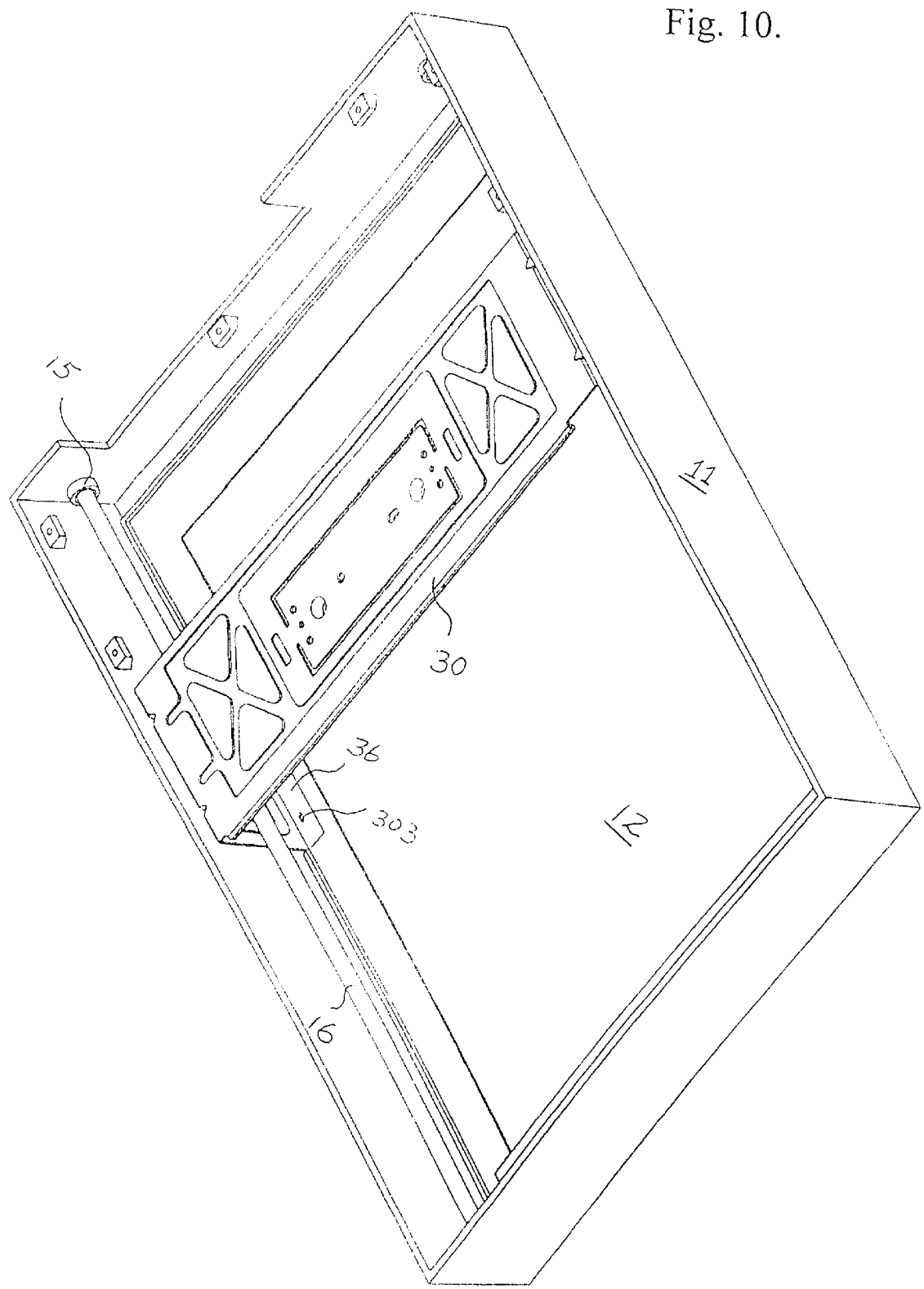
FIG. 10 shows the bottom pictorial view of the embodiment shown in FIG. 6.

FIG. 10 shows the bottom view of FIG. 6. Items 10, 12, 15 and 16 in FIG. 9 denote the same corresponding items in FIG. 6. Items 30, 36 and 303 correspond to items 20, 26 and 203 in FIG. 6, respectively.

While the preferred embodiments of the invention have been described, it will be apparent to those skilled in the art that various modifications may be made in the embodiments without departing from the spirit of the present invention. Such modifications are all within the scope of this invention.

What is claimed is:

1. A scanner, comprising:
    a window for placing a document to be scanned;
    a frame at the bottom of which is mounted a light sensor;
    a first set of flanges on top of said frame, having a top surface co-planar with respect to the top surface of said window such that the light path between said document and said light sensor does not fluctuate regardless of any interface tolerance of optical components in said light path, and
    brackets having a flat bottom surface for linking and planarizing the top surface of said first set of flanges with the top surface of said window.

2. The scanner as described in claim 1, further comprising a rail hanging on two side walls of said frame.

3. The scanner as described in claim 1, wherein said brackets are pinned to said first set of flanges.

4. A scanner, comprising;
    a window for placing a document to be scanned;
    a frame at the bottom of which is mounted a light sensor; and
    a first set of flanges on top of said frame, co-planar with respect to one of the surfaces of said window such that the light path between said document and said light sensor does not fluctuate regardless of any interface tolerance of optical components in said light path,
    wherein the frame is divided horizontally into a first section and a second section.

5. The scanner as described in claim 4, wherein said light sensor is mounted on one of the sections.

6. The scanner as described in claim 4, further comprising a second set of flanges orthogonal to said first set of flanges.

7. The scanner as described in claim 4, wherein the top surface of the glass window is co-planar with the top surface of the flanges.

8. The scanner as described in claim 4, wherein the top surface of the glass window is co-planar with the bottom surface of the flanges.

9. The scanner as described in claim 4, wherein the bottom surface of the glass window is co-planar with the top surface of the flanges.

10. The scanner as described in claim 4, wherein the bottom surface of the glass window is co-planar with the bottom surface of the flange.

11. A scanner, comprising:
    a window for placing a document to be scanned;
    a frame at the bottom of which is mounted a light sensor; and
    a first set of flanges on top of said frame co-planar with respect to one of the surfaces of said window such that the light path between said document and said light sensor does not fluctuate regardless of any interface tolerance of optical components in said light path,
    wherein said frame is divided into a first section, a second section, and a third middle section.

12. The scanner as described in claim 11, wherein said light sensor is mounted on the third middle section.

13. The scanner as described in claim 12, wherein the flanges of said third middle section is orthogonal to said first set of flanges.

14. The scanner as described in claim 11, wherein the top surface of the glass window is co-planar with the top surface of the flanges.

15. The scanner as described in claim 11, wherein the top surface of the glass window is co-planar with the bottom surface of the flanges.

16. The scanner as described in claim 11, wherein the bottom surface of the glass window is co-planar with the top surface of the flanges.

17. The scanner as described in claim 11, wherein the bottom surface of the glass window is co-planar with the bottom surface of the flanges.

* * * * *